United States Patent
Bright et al.

(10) Patent No.: US 8,931,269 B2
(45) Date of Patent: Jan. 13, 2015

(54) TEMPERATURE ACTIVATABLE ACTUATOR

(75) Inventors: Christopher G. Bright, Nottingham (GB); John E. Anthony, Derby (GB)

(73) Assignee: Rolls-Royce plc, London (GB)

( * ) Notice: Subject to any disclaimer, the term of this patent is extended or adjusted under 35 U.S.C. 154(b) by 296 days.

(21) Appl. No.: 13/375,601

(22) PCT Filed: May 24, 2010

(86) PCT No.: PCT/EP2010/057084
§ 371 (c)(1), (2), (4) Date: Dec. 1, 2011

(87) PCT Pub. No.: WO2010/145918
PCT Pub. Date: Dec. 23, 2010

(65) Prior Publication Data
US 2012/0067042 A1    Mar. 22, 2012

(30) Foreign Application Priority Data
Jun. 18, 2009 (GB) .................................. 0910476.1

(51) Int. Cl.
| F01B 29/10 | (2006.01) |
| F02G 1/04  | (2006.01) |
| F03G 7/06  | (2006.01) |
| F02K 1/08  | (2006.01) |

(52) U.S. Cl.
CPC  *F03G 7/065* (2013.01); *F03G 7/06* (2013.01); *F02K 1/085* (2013.01); *Y02T 50/671* (2013.01)
USPC .......................................................... 60/527

(58) Field of Classification Search
CPC ........... F03G 7/065; F03G 7/06; F02K 1/085; Y02T 50/671

USPC .............................. 60/527–529; 219/660–671
See application file for complete search history.

(56) References Cited

U.S. PATENT DOCUMENTS

| 4,540,866   | A  | * | 9/1985 | Okuda ........................... 219/664 |
| 5,191,302   | A  | * | 3/1993 | Rossnick ....................... 331/109  |
| RE38,024    | E  | * | 3/2003 | Adams et al. .............. 244/134 D    |
| 6,608,291   | B1 | * | 8/2003 | Collins et al. ................. 219/662  |
| 6,708,492   | B2 | * | 3/2004 | Sinclair .......................... 60/527 |

(Continued)

FOREIGN PATENT DOCUMENTS

| EP | 1 767 782 A1 | 3/2007 |
| GB | 1163105      | 9/1969 |

(Continued)

OTHER PUBLICATIONS

Search Report issued in British Patent Application No. 0910476.1 dated Sep. 23, 2009.

*Primary Examiner* — Thomas Denion
*Assistant Examiner* — Wesley Harris
(74) *Attorney, Agent, or Firm* — Oliff PLC

(57) ABSTRACT

An actuator is provided having a temperature activatable actuating member comprising an inductively couplable material. The actuator has an electrical heating element for electrically heating the actuating member. The heating element is configured to inductively couple with said material when an AC current is passed through the heating element such that an opposing electromotive force is induced in the heating element. A detector is provided for detecting activation of the actuating member by sensing a change in the AC impedance of the heating element.

14 Claims, 2 Drawing Sheets

(56) References Cited

U.S. PATENT DOCUMENTS

| | | | |
|---|---|---|---|
| 6,850,728 B2* | 2/2005 | Yokozeki et al. | 399/328 |
| 7,176,424 B2* | 2/2007 | Kim | 219/626 |
| 2006/0000211 A1 | 1/2006 | Webster | |
| 2006/0260534 A1* | 11/2006 | Petrakis | 116/216 |
| 2006/0289494 A1* | 12/2006 | Fishman et al. | 219/663 |
| 2007/0103029 A1* | 5/2007 | Fedder et al. | 310/307 |
| 2007/0175213 A1* | 8/2007 | Featherstone et al. | 60/527 |

FOREIGN PATENT DOCUMENTS

| | | |
|---|---|---|
| WO | WO 2008/129290 A1 | 10/2008 |
| WO | WO 2009/069574 A1 | 6/2009 |

* cited by examiner

TEMPERATURE ACTIVATABLE ACTUATOR

The present invention relates to temperature activatable actuators.

Temperature sensitive actuators can be used for controlling machines and industrial processes. Such devices typically include an actuating member which moves, expands or otherwise changes shape when heated in order to facilitate actuation. For example, US patent application number 2006/000211 discloses shape memory elements which, on heating, cause bypass exhaust nozzle noise reduction tabs to be angled into the bypass exhaust flow to increase flow mixing and thereby reduce mid to low frequency noise.

When employing such a device, it is useful to monitor the point at which actuation is achieved, in order to e.g. prevent energy wastage heating the device beyond this point or provide assurance that actuation has occurred. Temperature sensitive actuators based on shape memory alloys can also be degraded by prolonged overheating above the phase transition temperature, providing a further incentive to determine when the transition has occurred.

The resistivity of a shape memory alloy changes quite distinctly at the point of phase transition. For example, the austenitic phase of nickel-titanium shape memory alloy has an electrical resistivity of about 1 $\mu\Omega$m and the martensitic phase has an electrical resistivity of about 0.7 $\mu\Omega$m. Therefore, as the temperature of the shape memory alloy rises, the change from the martensitic phase to the austenitic phase increases the resistivity.

Actuators have been proposed which monitor the position and state of the actuator by measuring the electrical resistivity of a shape memory alloy. See, for example, the approaches taken in N. Ma et. al., Smart Mater. Struct., 13 777-783 (2004), and D. R. Madill and D. Wang, Proceedings of the 33rd IEEE Conference on Decision and Control, Volume 1, 14-16 Dec. 1994, 399-404 (1994). However, measuring the electrical resistivity of a shape memory alloy according to such approaches requires electrical contacts to be made to the alloy. The contacts can be difficult to make, are prone to failure and interference due to poor grounding of nearby electrical systems, and may suffer from the electrical current taking alternative, undesirable paths between the contacts, for example bypassing the shape memory alloy through other parts of the airframe It is therefore desirable to provide a means for monitoring the actuation of a temperature activatable actuating member without the need for affixing electrical contacts to the member.

Thus, according to a first aspect of the present invention, there is provided an actuator having:

a temperature activatable actuating member comprising an inductively couplable material, an electrical heating element for electrically heating the actuating member, the heating element being configured to inductively couple with said material when an AC current is passed through the heating element such that a current is induced in the inductively couplable material, said induced current causing an electromotive force that opposes said AC current to be induced in the heating element, and a detector for detecting activation of the actuating member by sensing a change in the AC impedance of the heating element.

Advantageously, activation of the actuator can be monitored without the need for affixing electrical contacts to the actuator.

In general, the resistivity of the inductively couplable material will change with temperature, whereby the electromotive force induced in the electrical heating element will also change with temperature. Thus, the AC impedance of the heating element of the heating element can be related to the temperature of the inductively couplable material, and hence to the state current passing through the electrical heating element and the voltage across it, respectively. The output of the voltage and current transducers may be combined in a circuit to calculate the AC impedance of the electrical heating element.

The electrical heating of activation of the actuating member. The temperature dependence of the material's resistivity can be particularly pronounced if the material undergoes a phase transition producing a step change in resistivity.

The actuator may have any one or any combination of the following optional features.

The detector may include a current transducer and voltage transducer for measuring the element is typically supplied with a separate heating current for heating the element. The heating current may conveniently be a DC current. For example, on certain types of aircraft (e.g. light aircraft and fighter aircraft) the electrical system is typically DC. If a DC current is used as a heating current, the AC current may be superimposed onto the DC heating current in order to induce the current in the inductively couplable material. The detector may comprise a filter arrangement for isolating the impedance measurement from the heating current. The filter arrangement may include a first filter for recovering AC current harmonics of the current through the electrical heating element, and a second filter for recovering the AC voltage harmonics of the voltage across the electrical heating element. The heating current can then be adjusted without disturbing the impedance measurement.

The actuator may have a rectifier for converting current from an AC power source into a DC current for use as the heating current. This may be useful where the actuator is required to be installed in an environment having an AC mains power supply only, but where a DC current is preferred for heating the electrical heating element. The AC current for inducing a current in the inductively couplable material may also be supplied by the AC harmonics output from the rectifier. The rectifier may be a three-phase rectifier, for use with a three phase power supply. Alternatively, the rectifier may be a single-phase rectifier.

The inductively couplable material may be any material in which a current can be induced by the changing magnetic field produced by the AC current in the electrical heating element, and whose resistivity changes as a function of temperature (including materials whose resistivity changes because of changes in an associated property, e.g. material phase, which it is desirable to measure). Preferably, the inductively couplable material is one which displays a step change in electrical resistivity at a certain temperature. Having a step change in resistivity can facilitate detection of a change in material phase (or another property) of the inductively couplable material. The inductively couplable material can be a shape memory alloy, e.g. a nickel-titanium shape memory alloy. In such alloys, a step change in resistivity is often associated with a phase transition in the alloy. The inductively couplable material may be a semiconductor or superconductor.

Preferably the inductively couplable material itself causes activation of the actuating member. For example, when the inductively couplable material is a shape memory alloy, the phase transition of the alloy may not only cause a step change in the electromotive force induced in the electrical heating element and hence the AC impedance of the heating element, but also drive the actuating member. Thus there may be a direct correlation between detection of a change in the impedance of the electrical heating element and actuator activation. Alternatively, however, the inductively couplable material may be a passive part of the actuating member, whereby the detector detects the activation of the member indirectly through a change in the AC impedance of the electrical heating element, but the inductively couplable material does not itself drive the actuating member.

The electrical heating element may be arranged so that it is co-planar with a surface of the actuating member, and preferably co-planar with a surface of the inductively couplable material. This can help to increase the size of the induced current and improve the response of the detector to changes in resistivity of the inductively couplable material.

The electrical heating element may have a flat coil geometry, e.g. a pancake coil geometry. Using a flat coil geometry can further promote the coupling between the heating element and the inductively couplable material by enhancing the magnetic field produced by the AC current in the electrical heating element.

The electrical heating element may be a cylindrical coil which is co-axial around a rod, shaft or similar long object. The cross-section of the rod, shaft or similar elongate object may comprise any shape. Furthermore, the cross-section of the electrical heating element may any shape.

The electrical heating element may be included in a frequency determining circuit (also known as a tank circuit) of an electrical oscillator, the detector being arranged to detect a change in frequency of the oscillator. Changes in the AC impedance of the electrical heating element produce changes in the frequency of the electrical oscillator which can be measured. An advantage of this arrangement is that a change in the impedance can be detected by measuring a single quantity, the oscillator frequency. Furthermore, frequency is a quantity which is often better suited to processing by digital systems than voltage and current. The actuator may comprise a filter arrangement for isolating the heating current from the electrical oscillator. The filter arrangement may include a choke for filtering the oscillator current from the heating current and/or a capacitor for blocking the heating current from flowing into the oscillator.

The actuator may be an actuator for changing the effective area of a gas turbine engine variable area exhaust nozzle. Varying particularly the cold exhaust nozzle area of a turbofan engine can reduce fuel burn during climb, reduce engine noise at take off, alleviate fan flutter at take off, reduce low pressure system peak speeds, allow weight reductions, and improve turbine entry temperature margins.

Indeed, a further aspect of the present invention provides, a gas turbine engine having a variable area exhaust nozzle and one or more actuators of the first aspect, wherein the actuators are arranged to change the effective area of the nozzle. The engine may be a turbofan, and the nozzle can be the cold exhaust nozzle.

Embodiments of the invention will now be described by way of example with reference to the accompanying drawings in which.

Figure 1:
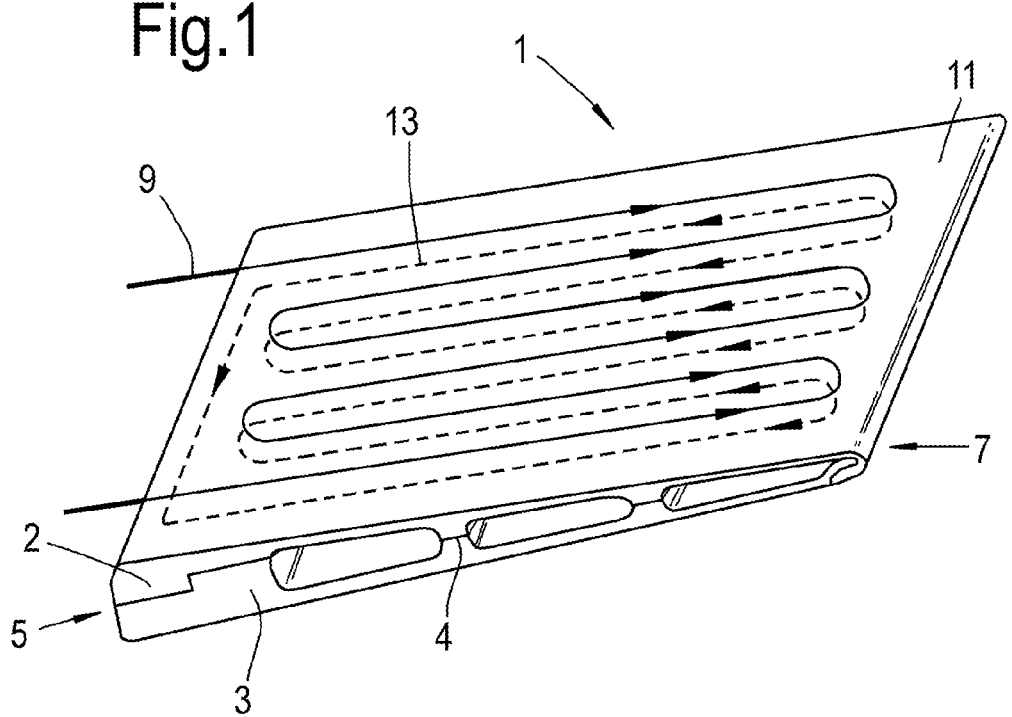
FIG. 1 shows schematically an actuator according to the present invention.

FIG. 1 shows schematically an actuator 1 according to the present invention for changing the effective area of an aero gas turbine engine variable area exhaust nozzle. Several such actuators are positioned around the circumference of the nozzle. The actuator comprises an actuating member formed from spaced apart shape memory element 2 and flexural element 3. These elements are joined together at the root edge 5 and at intermediate webs by bolts, brazes, welds or other fastening means. A mechanical hook fastening is used at the tip edge 7 of the actuating member. A flat foil-etched electrical heating element 9 overlies and is coplanar with a surface 11 of the shape memory element. The natural shape of the shape memory element is arcuate. However, below its transition temperature the shape memory material has a low elastic modulus, such that when the shape memory element is integrated into the actuating member its relatively low stiffness is overcome by the flexural element and the actuating member assumes a less arcuate, low temperature, non-deployed position. The shape memory element may be formed from nickel-titanium alloy and the flexural element from a titanium alloy.

When it is desired to activate the actuator, a DC heating current is passed through the electrical heating element 9, the temperature of the shape memory element 2 increases above its transition temperature, and the elastic modulus increases significantly. The stiffening of the shape memory element forces the actuating member into the shape memory element's natural arcuate shape, bending the member radially inwardly towards the exhaust stream. The flexural element 3 provides a returning force to the actuating member after the heating current is stopped and the shape memory element has cooled below its transition temperature. Cooling is assisted by the flow of ambient air over the actuator.

By using such actuators to vary the effective area of the nozzle, it is possible to reduce fuel burn during climb, and to reduce engine noise at take off. Each actuator has a detector, discussed in more detailed below, for detecting activation of the actuating member. The detector avoids wasting energy on overheating the actuating member after activation. As such overheating can degrade the performance of the shape memory alloy, the performance and reliability of the actuator may also be improved.

An AC current passed through the heating element 9 and superimposed on the DC heating current induces a current 13 to flow through the inductively couplable material. In accordance with Lenz's law, the direction of the current induced in the inductively couplable material is such as to induce an electromotive force in the heating element opposing the AC current in the heating element.

Figure 2:
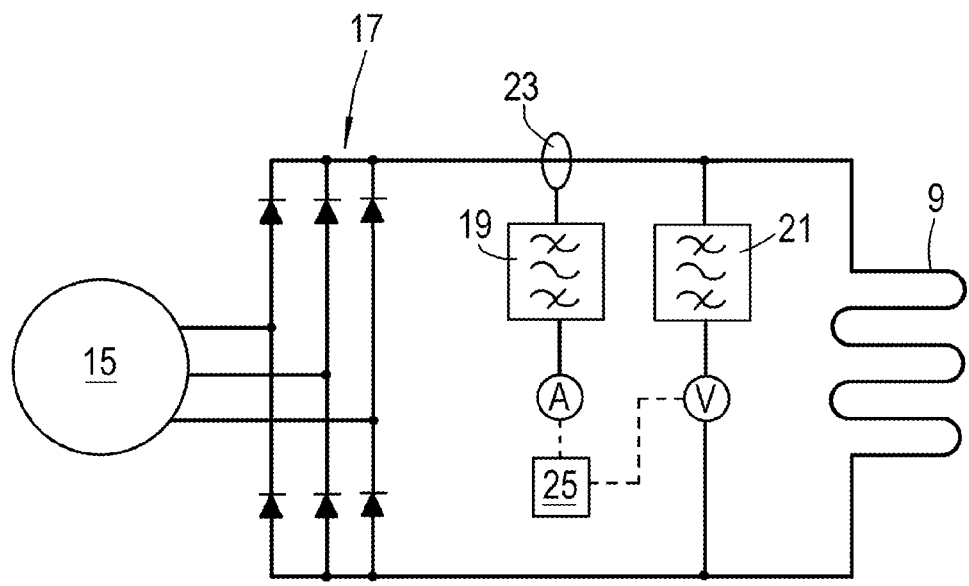
FIG. 2 shows a first embodiment of a circuit for controlling the actuator of FIG. 1.

FIG. 2 shows a first embodiment of a circuit for controlling the actuator. In this embodiment, a three phase AC power source 15 (such as a typical 400 Hz aircraft AC supply) supplies current to the electrical heating element 9. A rectifier 17 converts the current from the AC source to DC current. The output from the rectifier also contains harmonics of the input AC current frequency. These harmonics are used to provide the AC current necessary for inducing the opposing current in the heating element. A detector monitors changes in the AC impedance of the electrical heating element, these changes following changes in resistivity of the inductively couplable material due to heating.

The detector comprises an ammeter A and a voltmeter V on respective circuit branches connected across the heating element, the ammeter and voltmeter being provided with respective frequency band pass filters 19, 21 for recovering the AC harmonic frequencies of the current passing through the heating element and for recovering AC harmonic of the voltage across it. A current transformer 23 induces a current flow on the ammeter circuit branch which is proportional to the AC current flowing through the heating element. The ammeter and voltmeter are connected to a circuit 25 which determines the impedance of the electrical heating element from the ammeter and voltmeter measurements. The measured impedance indicates whether the shape change alloy is above or below its transition temperature, and hence detects the state of activation of the actuator. Depending on the detected state, a controller (not shown) adjusts the power supplied to the electric heater by controlling the three phase power supply or by controlling the rectifier. Controlling the rectifier has an advantage that specific AC harmonic frequencies can be selected. Single phase AC supplies may be used in a similar way.

Advantageously, the detector does not require an electrical connection to the shape memory element 2. Further, there is no need for telemetry circuits between the shape memory element and the control circuit.

Figure 3:
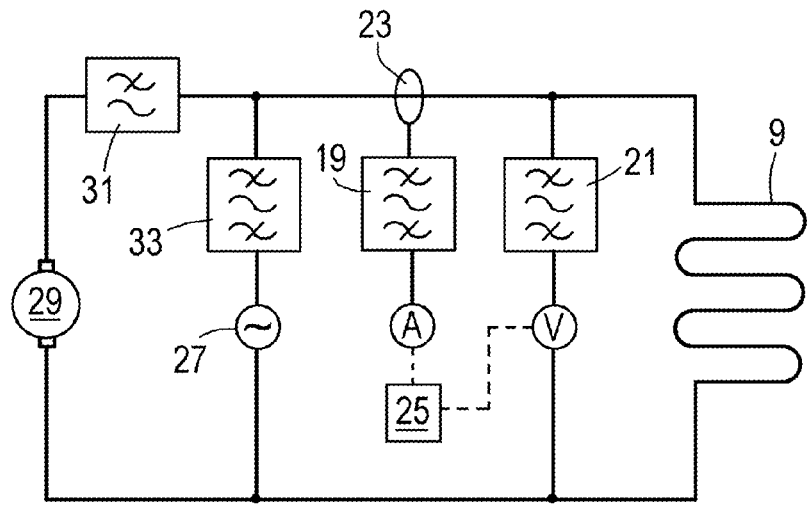
FIG. 3 shows a second embodiment of a circuit for controlling the actuator of FIG. 1.

FIG. 3 shows a second embodiment of a circuit for controlling the actuator. Features which are common to the second and first embodiments have the same reference numbers in FIGS. 2 and 3. In the second embodiment, the circuit has separate AC 27 and DC 29 power sources. The AC source superimposes an AC current on the DC current used for heating the electrical heating element 9. The DC source may be an aircraft 28 V DC or 270 V DC supply. A low pass filter 31 prevents the AC current from entering the DC supply. The AC supply has a band pass filter 33 for selecting a particular AC frequency. This filter also blocks the DC heating current from entering the AC supply.

The DC source 29 in the second embodiment may be replaced by an AC source of lower frequency than the AC source 27 if it is desired to use an AC heating current. In such an arrangement, the impedance measurement can still be isolated from the heating current by using suitable band pass filters in the detector. For example, the low pass filter 31 can be replaced by a band pass filter designed to pass the AC heating current but block the frequency of the AC source 27 used for measuring the impedance of the electrical heating element.

Figure 4:
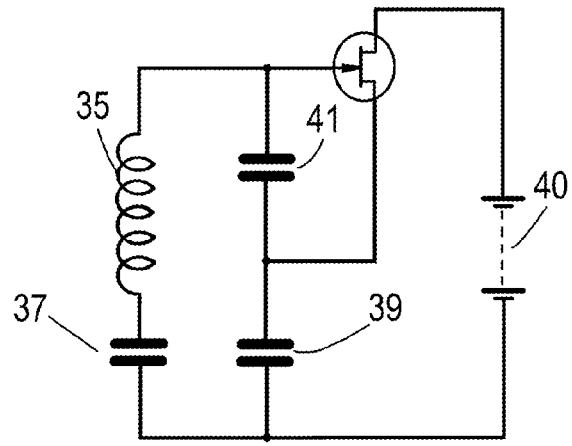
FIG. 4 shows a simplified electrical diagram of a Clapp oscillator with the DC biasing omitted, useful for understanding a third embodiment of the present invention.

In a third embodiment, the electrical heating element is included in a frequency determining circuit (also known as a tank circuit) of an electrical oscillator. FIG. 4 shows a Clapp oscillator which may be used for this purpose, although other designs of oscillator may be used. The frequency of the Clapp oscillator is determined by an inductor 35 and capacitors 37, 39 and 41. A DC power supply 40 generates an oscillator current in the oscillator circuit, the oscillator current having a resonant frequency determined by the inductance of the inductor and the capacitance of the capacitors 37, 39 and 41.

Figure 5:
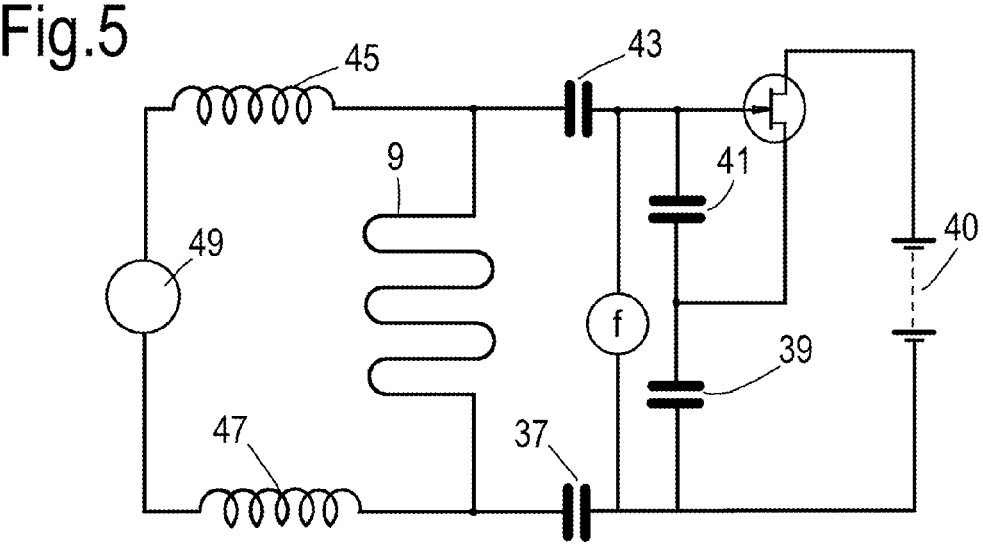
FIG. 5 shows a third embodiment of a circuit for controlling the actuator of FIG. 1.

FIG. 5 shows a modified form of the Clapp oscillator used to measure changes in the AC impedance of the heating element in a third embodiment of the invention. Again, features which are common to the third embodiment and the first or second embodiment have the same reference numbers in FIGS. 2 to 5. The electrical heating element 9 takes the place of inductor 35 in FIG. 4 and an additional capacitor 43 is connected in series with the electrical heating element. The inductance of the heating element will vary depending on the size of the electromotive force that is induced in it by the inductively couplable material and hence by the AC impedance of the heating element. The frequency of the oscillator current can thus be used to sense a change in this impedance. The frequency of the oscillator current may be measured at any convenient point on the oscillator circuit. For example, a high impedance detector can be connected across one or more convenient circuit components. In FIG. 5 a high impedance detector, f, is connected across capacitors 39, 41 to isolate the detector from the DC supply 40 to the oscillator and a second electrical supply 49 which supplies a heating current to the electrical heating element.

The second electric power supply 49 may be a DC current supply or an AC current supply. Capacitors 43 and 37 serve as blocking capacitors to stop the heating current from flowing into the oscillator circuit and affecting its operation. Chokes 45 and 47 are provided to block the oscillator current from passing through the electrical supply supplying the heating current.

The blocking functions of chokes 45 and 47, and capacitors 37 and 43, are made more effective by designing the modified Clapp oscillator to oscillate at a much higher frequency than that of the electrical supply that supplies the heating current. A higher frequency also ensures that chokes 45 and 47 do not present undue impedance to the electrical supply that supplies the heating current and that capacitors 37 and 43 are not unduly large. As the skilled person would recognise, the oscillator may be DC biased, but this is omitted from FIGS. 4 and 5 for clarity.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references cited herein are incorporated by reference.

The invention claime is:

1. An actuator having:
    a temperature activatable actuating member comprising an inductively couplable material,
    an electrical heating element for electrically heating the actuating member, the heating element being inductively coupled with said material when an AC current is passed through the heating element such that a current is induced in the inductively couplable material, said induced current causing an electromotive force that opposes said AC current to be induced in the heating element, and
    a detector for detecting activation of the actuating member by sensing a change in the AC impedance of the heating element.

2. The actuator according to claim 1, wherein a heating current of the electrical heating element is a DC current.

3. The actuator according to claim 1, wherein the actuator has a rectifier for converting current from an AC power source into a DC current for use as the heating current.

4. The actuator according to claim 3, wherein the rectifier is a three phase rectifier.

5. The actuator according to claim 1, wherein, in use, the AC current is superimposed on the heating current of the heating element, and the detector comprises a filter arrangement for isolating the AC impedance measurement from the heating current.

6. The actuator according to claim 5, wherein the filter arrangement comprise a first filter for recovering AC current harmonics of the current passing through the electrical heating element, and a second filter for recovering AC voltage harmonics of the voltage across the electrical heating element.

7. The actuator according to claim 1, wherein the electrical heating element is included in a frequency determining circuit of an electrical oscillator, and the detector is arranged to detect a change in frequency of the oscillator current.

8. The actuator according to claim 7, wherein the actuator comprises a filter arrangement for isolating the heating current of the heating element from the electrical oscillator.

9. The actuator according to claim 8, wherein the filter arrangement includes a choke for filtering the oscillator current from the heating current.

10. The actuator according to claim 8, wherein the filter arrangement includes a capacitor for blocking the heating current from flowing into the oscillator.

11. The actuator according to claim 1 wherein the inductively couplable material is a shape memory alloy.

12. The actuator according to claim 1, wherein the heating element is co-planar with a surface of the actuating member.

13. The actuator according to claim 1 which is an actuator for changing the effective area of a gas turbine engine variable area exhaust nozzle 14. A gas turbine engine having a variable area exhaust nozzle and one or more actuators according to claim 13.

* * * * *